(12) United States Patent
Hasegawa et al.

(10) Patent No.: US 6,848,698 B2
(45) Date of Patent: Feb. 1, 2005

(54) SADDLE-RIDE TYPE VEHICLE STEERING DAMPER APPARATUS

(75) Inventors: Yosuke Hasegawa, Saitama (JP); Takeyasu Itabashi, Saitama (JP); Kanji Hayashi, Saitama (JP); Takeshi Wakabayashi, Saitama (JP); Osamu Bunya, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 105 days.

(21) Appl. No.: 10/231,108

(22) Filed: Aug. 30, 2002

(65) Prior Publication Data

US 2003/0047903 A1 Mar. 13, 2003

(30) Foreign Application Priority Data

Sep. 7, 2001 (JP) ........................................ 2001-272584

(51) Int. Cl.⁷ .............................................. B62K 21/08
(52) U.S. Cl. ......................... 280/272; 280/90; 74/551.8
(58) Field of Search ................................ 280/272–275, 280/283, 90; 188/306, 307, 290; 74/551.2, 551.8; 180/417

(56) References Cited

U.S. PATENT DOCUMENTS

| 4,773,514 A | | 9/1988 | Gustafsson | |
|---|---|---|---|---|
| 5,492,033 A | * | 2/1996 | Hopey | 74/551.1 |
| 5,836,213 A | * | 11/1998 | Hopey | 74/551.2 |
| 5,927,740 A | * | 7/1999 | Hopey | 280/272 |
| 6,145,637 A | * | 11/2000 | Hopey | 188/306 |
| 6,220,407 B1 | * | 4/2001 | Gustafsson et al. | 188/307 |
| 6,494,302 B2 | * | 12/2002 | Gustafsson et al. | 188/307 |
| 2003/0047904 A1 | * | 3/2003 | Hasegawa et al. | 280/272 |
| 2003/0111308 A1 | * | 6/2003 | VanValkenburgh et al. | 188/290 |
| 2003/0127824 A1 | * | 7/2003 | Hasegawa et al. | 280/272 |
| 2003/0132598 A1 | * | 7/2003 | Bunya et al. | 280/272 |
| 2003/0146594 A1 | * | 8/2003 | Bunya et al. | 280/272 |
| 2003/0234508 A1 | * | 12/2003 | Hanawa et al. | 280/272 |

FOREIGN PATENT DOCUMENTS

| FR | 2819778 A1 | * | 7/2002 | ........... B62K/21/08 |
|---|---|---|---|---|
| JP | 63-64888 A | | 3/1988 | |
| JP | 7-74023 B | | 8/1995 | |
| JP | 2593461 B | | 12/1996 | |
| JP | 2001099208 A | * | 4/2001 | ............. F16F/9/14 |

\* cited by examiner

Primary Examiner—Lesley D. Morris
Assistant Examiner—Daniel Yeagley
(74) Attorney, Agent, or Firm—Birch, Stewart, Kolasch & Birch, LLP (57) ABSTRACT

If a steering damper is fixed to a top bridge, since the steering damper is comparatively heavy and the top bridge is on the steering side, steering inertia increases. An arrangement structure of the steering damper which does not greatly influence the steering inertia has been realized. A rotatable partition wall is provided in a hydraulic chamber of a steering damper to partition the inside into a right hydraulic chamber and a left hydraulic chamber. Both hydraulic chambers are in communication with each other by a liquid passage. A control valve is provided in an intermediate part of the passage and is switched to a lock or a throttle thereby a damping force zero status or a damping force generation status is set.

23 Claims, 5 Drawing Sheets

SADDLE-RIDE TYPE VEHICLE STEERING DAMPER APPARATUS

BACKGROUND OF THE INVENTION

1. Field of the Invention

The present invention relates to a hydraulic steering damper apparatus for a saddle-ride type vehicle such as a motorcycle, used for controlling the oscillation of handling upon running. More particularly, the present invention relates to an apparatus, which can provide a variable damping force.

2. Description of Background Art

To prevent the oscillation of handling due to kick-back upon external perturbations, a hydraulic steering damper apparatus which produces a damping force to the oscillation is known from, for example, Japanese Patent No. 2593461. Furthermore, an apparatus for producing a variable damping force arranged to produce a damping force only when necessary, while not to produce the damping force in other cases, is known. For example, an apparatus which performs a control based on a steering angle and a running speed is known from Japanese Published Unexamined Patent Application No. Sho 63-64888 and an apparatus which performs a control based on a change in the load on a front wheel is known from Japanese Published Examined Patent Application No. Hei 7-74023.

If such a steering damper is fixed to a top bridge, since the steering damper is comparatively heavy in weight and the top bridge is on the steering side, the steering inertia is increased.

SUMMARY OF THE INVENTION

In view of the above, an object of the present invention is to provide an arrangement of a steering damper, which does not to greatly influence the steering inertia.

To attain the above object, according to a first aspect of the present invention, a saddle-ride type vehicle steering damper apparatus includes a steering damper in which a hydraulic chamber filled with working liquid is formed in a casing. The inside of the hydraulic chamber is partitioned into two small hydraulic chambers by a rotatable partition wall provided in the hydraulic chamber. The small hydraulic chambers are in communication with each other via a liquid passage with a throttle. A damping force is caused by relative rotation between the partition wall and the hydraulic chamber. Furthermore, a rotation shaft of the partition wall is coupled to a steering shaft supported rotatably to a vehicle body front part, and the casing is fixed to vehicle body front part.

According to a second aspect of the present invention, the partition wall includes the rotation shaft at a rotation radial direction inner end. A rotation radial direction outer end, as the other end, rotates along an inner wall of the hydraulic chamber.

According to a third aspect of the present invention, a main switch is provided in a top bridge supported rotatably to the vehicle body front part via the steering shaft. The main switch and the rotation radial direction outer end of the partition wall are provided opposite to each other with the steering shaft therebetween.

According to a fourth aspect of the present invention, the throttle of the liquid passage and the rotation radial direction outer end of the partition wall are provided opposite to each other with the steering shaft therebetween.

According to a fifth aspect of the present invention, the throttle has a variable throttle mechanism. A control member of the variable throttle mechanism and the partition wall are provided opposite to each other with the steering shaft therebetween. A control valve, this control device and the like can be used as a control member of the variable throttle mechanism.

According to a sixth aspect of the present invention, the casing is provided above the steering shaft and a turning angle sensor is provided above the casing. A rotation shaft of the turning angle sensor is coupled to the rotation shaft of the partition wall.

According to the first aspect of the present invention, among the steering damper constituents, the comparatively light-weight partition wall is provided on the steering side while the heavier casing is fixed on the vehicle body side. Therefore, an increase in steering inertia can be suppressed. Furthermore, the space-saving rotation shaft side is provided on or around the comparatively space-lacking steering shaft, while the larger casing is provided on the comparatively spacious vehicle body. Therefore, the steering damper can be easily arranged.

According to the second aspect of the present invention, the hydraulic chamber accommodating the partition wall, which rotates about the rotation shaft co-axial with the steering shaft in an approximate sector shape can be provided in the casing on the vehicle body. Accordingly, the capacity of the hydraulic chamber can be increased so as to increase the damper effect.

According to the third aspect of the present invention, a major portion of the steering damper and the main switch are positioned on opposite sides with the steering shaft therebetween. Accordingly, the steering damper can be arranged sufficiently away from the main switch so as not to disturb key operation at the main switch. Thus, excellent key operability at the main switch can be maintained.

According to the fourth aspect of the present invention, the throttle of the liquid passage and the rotation radial direction outer end of the partition wall are provided on opposite sides with the steering shaft therebetween. Accordingly, the liquid passage can be comparatively short and be provided around the steering shaft. Furthermore, the throttle can be provided, with spatial allowance, away from the rotation radial direction outer end of the partition wall where the width of the hydraulic chamber expands to a maximum width.

According to the fifth aspect of the present invention, if the throttle has a variable throttle mechanism, the control member of the variable throttle mechanism and the partition wall are provided on opposite sides with the steering shaft therebetween. Accordingly, the liquid passage can be comparatively short and be provided around the steering shaft. Furthermore, the control valve and the control device and the like as the control member of the variable throttle mechanism can be provided, with spatial allowance, away from the rotation radial direction outer end of the partition wall where the width of the hydraulic chamber expands to a maximum width.

According to the sixth aspect of the present invention, the rotation shaft of the turning angle sensor is coupled to the steering shaft by engagement. Accordingly, the rotation shaft and the steering shaft can be easily coupled to each other. Furthermore, by directly coupling both of the shafts, the turning angle of the steering shaft can be precisely measured.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
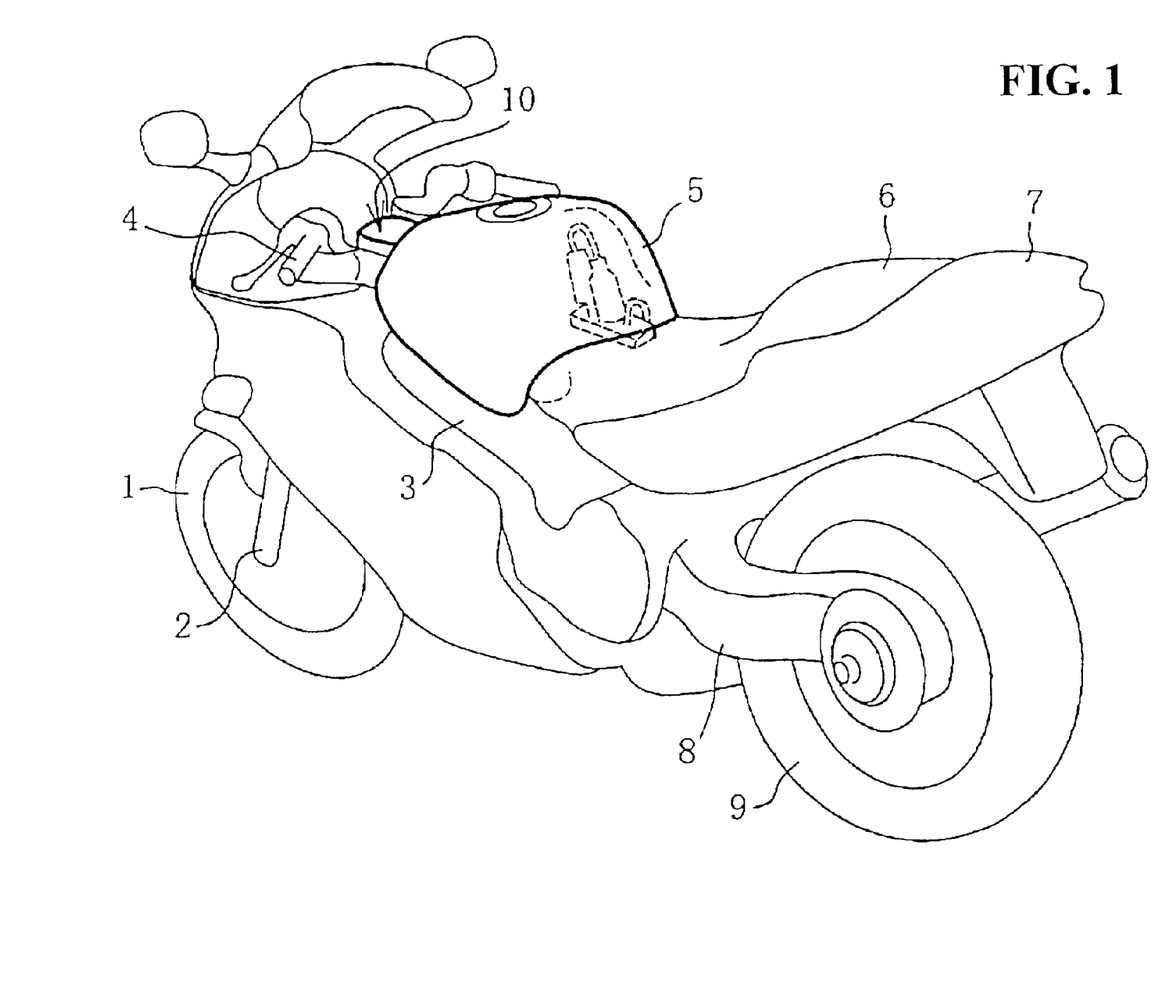
FIG. 1 is a perspective view of motorcycle to which the present invention is applied.
Figure 2:
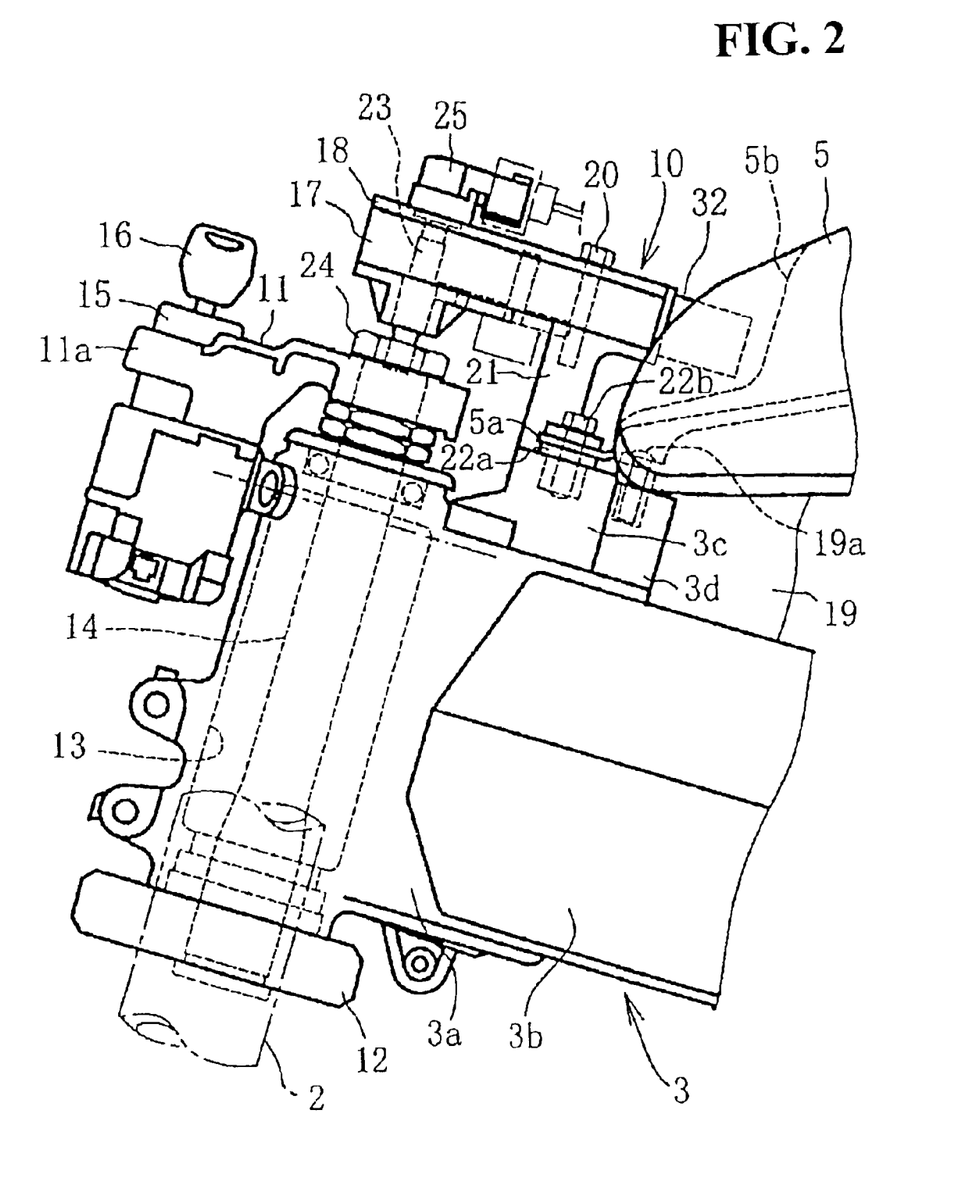
FIG. 2 is a side view of a vehicle front part showing the steering damper device portion.
Figure 3:
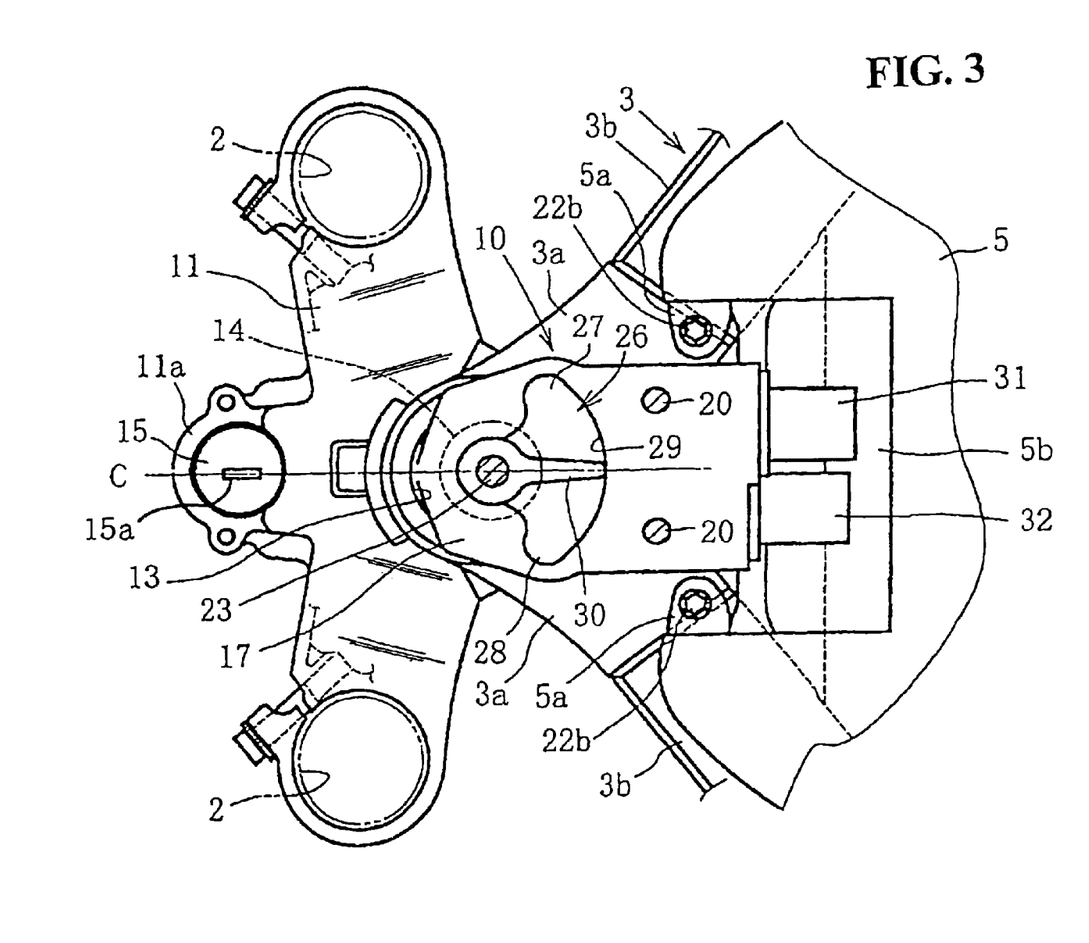
FIG. 3 is a plan view of the above portion of FIG. 2.
Figure 4:
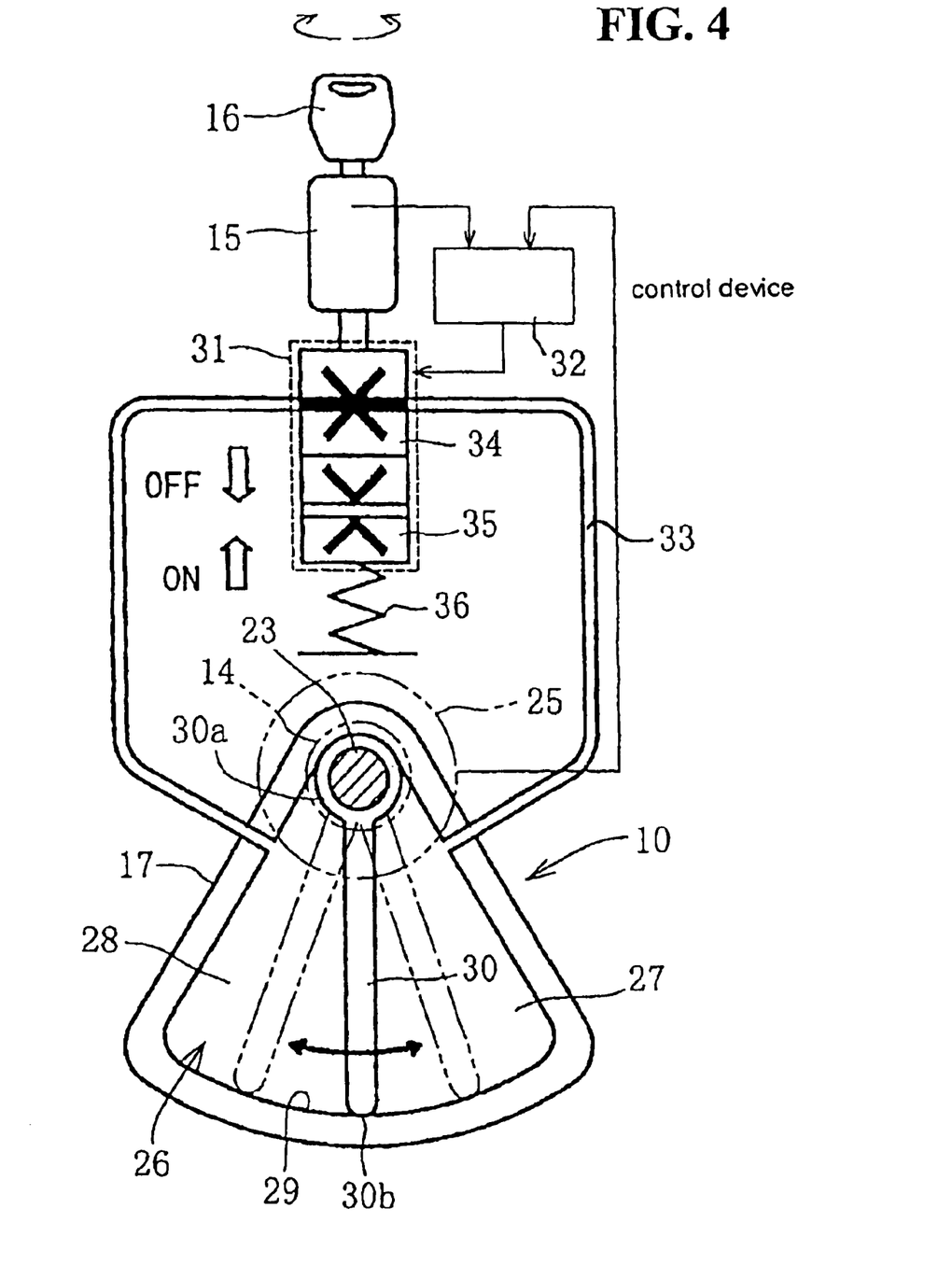
FIG. 4 is a diagram showing a schematic structure of the steering damper.

Hereinbelow, a first embodiment of the present invention will be described with reference to the accompanying drawings. FIG. 1 is a perspective view of motorcycle to which the first embodiment of the present invention is applied. FIG. 2 is a structural side view of a vehicle body front part where a steering damper is provided. FIG. 3 is a plan view of FIG. 2. FIG. 4 is a diagram showing a schematic structure of the steering damper.

In FIG. 1, an upper part of a front fork 2 is coupled to a front part of a vehicle body frame 3 and is rotatable by handlebars 4. The front fork 2 supports a front wheel 1 at a lower end thereof. A fuel tank 5 is supported on the vehicle body frame 3. Reference numeral 6 identifies a seat, reference numeral 7 identifies a rear cowl, reference numeral 8 identifies a rear swing arm, and reference numeral 9 identifies a rear wheel.

The steering damper of the present invention will now be described. As shown in FIGS. 2 and 3, a steering damper 10 is provided between a top bridge 11 and a head 3a as a front end of the vehicle body frame 3. The handlebars 4 are attached to the top bridge 11. The top bridge 11 is integrated with a bottom bridge 12 in a lower position in pair, holding a steering shaft 14 supported by a head pipe 13 therebetween. The top bridge 11 and bottom bridge 12 and the steering shaft 14 integrally rotate.

Respective upper parts of a pair of left and right front forks 2 are supported by the top bridge 11 and the bottom bridge 12. The head pipe 13 is a pipe-shaped part integrally formed with the head 3a of the vehicle body frame 3. Note that the vehicle body frame 3 includes the head 3a and a main frame 3b as a pair of left and right parts extending left and rearward and right and rearward from left and right positions of the rear end of the head 3a (See FIG. 3).

A stay 11a projects frontward and is integrally provided with a front central part of the top bridge 11. A main switch 15 is supported by the stay 11a. An unlocking operation, a switching operation and the like are performed by operation of key 16, which cooperates with the main switch 15. Reference numeral 15a in FIG. 3 denotes a key hole in which the key 16 is inserted. Note that the main switch 15 is an electric system switch to turn powers of the engine ignition system, lamp system and the like ON/OFF. A handle lock to unrotatably fix the handle 4 to the vehicle body side upon parking is integrally formed with the main switch 15. The key 16 also serves as a handle lock unlock key.

The steering damper 10 of the present embodiment is a hydraulic damper to prevent kick back. It has a main body 17 and a lid 18 (FIG. 2). A rear side of the steering damper 10 is fastened to a boss 21, which projects above and is integrally formed with an upper surface of the head 3a of the vehicle body frame 3 around the head pipe 13 by a bolt 20. At this time, the main body 17 and the lid 18 are integrated by fastening. The boss 21 is previously provided with a nut. Note that the main body 17 and the lid 18 construct the casing of the steering damper of the present embodiment.

A step 3c which is one-level higher is formed in a rear upper surface of the head 3a in left and right positions of the boss 21. A stay 5a is formed in left and right positions in a front end of the fuel tank 5 and is attached to the step 3c via a rubber member 22a by a bolt 22b in vibration proof status. The stay 5a projects toward the vehicle body central side from both sides of a front end of a concave member 5b, which is opened frontward and upward at a front center of the fuel tank 5. The stay 5a is provided overlapped with the step 3c around a position where the front end of the main frame 3b is connected.

An air cleaner 19 is provided under the fuel tank 5. A front end of the air cleaner 19 is attached to an attachment member 3d at a rear end of the head 3a by a bolt 19a in a position below the concave member 5b. The attachment member 3d projects continuously from the step 3c rearward and toward a position below the concave member 5b (FIG. 2).

A shaft 23 is provided having an axial line extending upward and downward in FIG. 2 through a front part of the steering damper 10. A lower end of the shaft 23 projects downward from the main body 17 of the steering damper 10 and is with an upper end of the steering shaft 14. Accordingly, the shaft 23 and the steering shaft 14 are simply coupled such that both shafts are rotatably integrated. The shaft 23 is provided coaxial with the steering shaft 14.

Numeral 24 is a steering nut, which fastens the upper end of the steering shaft 14 to the top bridge 11. The lower end of the shaft 23 passes through a hole formed in a central portion of the steering nut 24.

The upper part side of the shaft 23 passes upward through the lid 18. An upper end of the shaft 23 enters a turning angle sensor 25 fixed on the lid 18. The turning angle sensor 25 is a well known sensor using an electric resistor or the like. The sensor detects a turning angle of relative rotation of the shaft 23 to the main body 17 of the steering damper 10, thereby detecting a turning angle of the steering shaft 14 which integrally rotates with the shaft 23. The turning angle sensor then outputs a detection signal to a control device to be described later.

The steering damper 10 in FIG. 3 shows the structure on the main body 17 side except for the lid 18. Reference numeral 26 identifies an approximately sector-shaped hydraulic chamber formed by a concave member provided in the main body 17. Reference numeral 27 identifies a right hydraulic chamber. Reference numeral 28 identifies a left hydraulic chamber. Reference numeral 30 identifies a wing-shaped partition wall separating the left and right hydraulic chambers with one end integrated with the shaft 23 to rotate integrally with the shaft 23. Reference numeral 31 identifies a control valve and reference numeral 32 identifies the above-described control device.

It should be noted that the main switch 15, the steering shaft 14 and the shaft 23 are positioned on approximately the same straight line to a vehicle body center line C, and a key hole 15a is positioned on or around the vehicle body center line C. Furthermore, the main switch 15, the control valve 31 and the control device 32 are positioned on opposite sides in frontward and rearward directions with the steering shaft 14 located therebetween. The control valve 31 and the control device 32 are provided in left and right positions with the vehicle body center line C therebetween. The control valve 31 and the control device 32 are attached to a rear part of the main body 17.

FIG. 4 schematically shows the structure of the steering damper 10. In the steering damper 10, the sector-shaped hydraulic chamber 26 is provided expanding rearwardly. The shaft 23 is positioned in the pivotal point of the sector. The inside of the hydraulic chamber 26 is separated into two parts. Specifically, the hydraulic chamber 26 is separated into the right hydraulic chamber 27 and the left hydraulic chamber 28 by the partition wall 30, which extends rearward integrally with the shaft 23. The partition wall 30 is interlocked with the rotation of the shaft 23 and is rotatable in the hydraulic chamber 26 about the shaft 23.

A rotation radial direction inner end 30a of the partition wall 30 is integral with the shaft 23. A rotation radial direction outer end 30b of the partition wall 30 as the other end side is in sliding contact with an inner surface of an arc wall 29 of the hydraulic chamber 26 and rotates along the inner surface. The right hydraulic chamber 27 and the left hydraulic chamber 28 are filled with non-compressive type liquid such as oil. The left and right hydraulic chambers 27 and 28 are in communication with each other via a liquid passage 33. Accordingly, when the front wheel performs an oscillation leftward and rightward, the working liquid moves from one hydraulic chamber, where the capacity is reduced by rotation of the partition wall 30 interlocked with the front wheel via the steering shaft 14 and the shaft 23 (phantom line in FIG. 3), through the liquid passage 33, to the opposite expanded hydraulic chamber in correspondence with the change in capacity of the hydraulic chamber.

A control valve 31 is provided in a middle part of the liquid passage 33. The control valve 31 has a lock 34 to stop liquid movement in the liquid passage 33 and a throttle 35 to cause a damping force by limiting the liquid movement in the liquid passage 33.

The lock 34 and the throttle 35 are selected in correspondence with the main switch 15. When the main switch 15 is turned OFF, the control valve 31 moves downward in the figure, i.e., in a direction crossing the liquid passage 33, against a return spring 36. The lock 34 is connected to the liquid passage 33 to block the connection between the left and right hydraulic chambers 27 and 28. Accordingly, the lock 34 sets the passage of a working liquid in a locked status (illustrated status), where the liquid movement is stopped. In the working liquid locked status, since the partition wall 30 becomes unrotatable, the steering shaft 14 also becomes unrotatable via the shaft 23. The handle 4 is unrotatably fixed in a handle locked status.

On the other hand, when the main switch 15 is turned ON, the control valve 31 moves upward in the figure by the return spring 36. The throttle 35 is connected to the liquid passage 33 such that the left and right hydraulic chambers 27 and 28 are in communication with each other. Accordingly, liquid movement between the hydraulic chambers becomes possible. Furthermore, the throttle 35 reduces a cross-sectional area of the liquid passage 33 to limit the liquid movement of the working liquid in accordance with a change in capacity between the left and right hydraulic chambers 27 and 28 to cause a damping force.

Furthermore, the throttle 35 is a variable throttle passage. Accordingly, the above-described damping force can be variable by changing the cross-sectional area of the passage. Thus, a damping force corresponding to the turning angle of the steering shaft 14 is generated. The amount of limitation in the variable throttle passage is controlled by the control valve 31. The throttle operation by the control valve 31 and the above-described switching between the lock 34 and the throttle 35 are controlled by an operation control device 32. The control valve 31 of the present embodiment comprises a linear solenoid, which linearly moves a driving member thereof.

The control device 32, comprising an ECU or the like, controls the control valve 31 based on an ON/OFF signal from the main switch and the detection signal from the turning angle sensor 25. First, the switching between the lock 34 and the throttle 35 is made as follows. When the main switch 15 is turned OFF, the control device 32, which detects the turning off of the switch, moves the control valve 31 to connect the lock 34 to the liquid passage 33, so as to set the handle in a locked status. On the other hand, when the main switch 15 is turned ON, the control device 32 which detects the turning on of the switch and moves the control valve 36 upward in the figure to connect the throttle 35 to the liquid passage 33, so as to set a damping force generation status.

In the throttle control, in a status where the throttle 35 is connected to the liquid passage 33, the control device 32 calculates a turning angle speed by differentiating the turning angle detected by the turning angle sensor 25 by time. The control device 32 then adjusts a damping force to an appropriate value by changing the throttle of the control valve 31 in correspondence with the turning angle speed.

The operation of the present embodiment will now be described. Upon travel in a straight line, a rider holds the handle in a neutral position. However, when the front wheel 1 performs an oscillation due to road surface conditions, the control device 32 controls the control valve 31 in correspondence with the turning angle speed of the oscillating to generate an appropriate damping force. Accordingly, when the turning angle speed of the steering shaft 14 is small, a small damping force is generated to attain agile handle operation. As the turning angle speed of the steering shaft 14 increases, a greater damping force is generated to appropriately regulate the rotation of the partition wall 30 to further appropriately regulate the rotation of the steering shaft 14 via the shaft 23, thereby effectively preventing kick back.

Furthermore, a working liquid lock mechanism is formed by providing the control valve 31 with the lock 34. The mechanism can be used as a theft prevention handle lock mechanism which can be used as a low-price and light-weight handle lock in place of a conventional handle lock. Furthermore, if the handle lock is used with a conventional handle lock, a higher-level theft prevention mechanism can be realized.

Furthermore, among the parts constructing the steering damper 10, the comparatively light-weight partition wall 30 as the steering side is coupled to the top bridge 11. Most of the parts of the steering damper 10, including the heavier main body 17, are fixed to the head 3a on the vehicle body side. Accordingly, the increase in steering inertia can be suppressed. Furthermore, the space-saving shaft 23 side is provided on the comparatively space-lacking steering shaft 14 and the greater main body 17 side is provided on the comparatively spacious vehicle body. Accordingly, the steering damper 10 can be easily provided.

In addition, the hydraulic chamber 26 can be provided in the main body 17 in the rear of the steering shaft 14 and on the head 3a. Accordingly, the hydraulic chamber 26 can be provided without difficulty. The hydraulic chamber 26 includes the approximately sector shape where a rear side thereof expands for accommodation of the partition wall 30, which rotates in an approximate sector shape about the shaft 23 coaxial with the steering shaft 14. Furthermore, the capacity of the hydraulic chamber 26 can be increased and the damper effect can be further improved.

Furthermore, the major portion of the steering damper 10 and the main switch 15 are positioned on opposite sides with the steering shaft 14 therebetween. Accordingly, the steering damper 10 can be provided sufficiently away from the main switch 15 so as not to disturb key operation at the main switch 15. Therefore, excellent operability of the key 16 to the main switch 10 can be maintained.

Furthermore, the shaft 23 as the rotation shaft of the turning angle sensor 25 is coupled to the steering shaft 14 by engagement. Accordingly, the shaft 23 and the steering shaft 14 can be easily coupled. Furthermore, by directly connecting both of the shafts, the turning angle of the steering shaft 14 can be precisely measured.

It should be noted that FIG. 4 is a schematic diagram showing the structure of the steering damper 10 as a principle. FIG. 4 is different from the actual structure shown in FIG. 3 in the arrangement of the liquid passage 33, the control valve 31 and the control device 32. However, the arrangement as shown in FIG. 4 can be employed. In this case, the variable throttle of the liquid passage 33 and the control valve 31 and the control device 32 as control members for the variable throttle are provided on the vehicle body front side as an opposite side to the rotation radial direction outer end 30b of the partition wall 30 with the steering shaft 14 therebetween. Accordingly, the liquid passage 33 can be comparatively short and can be provided around the steering shaft 14. Furthermore, the variable throttle of the liquid passage 33 and the control valve 31 and the control device 32 as control members for the variable throttle can be provided, with spatial allowance, in a position away from the rotation radial direction outer end 30b of the partition wall 30 where the width of the hydraulic chamber 26 most expands.

Figure 5:
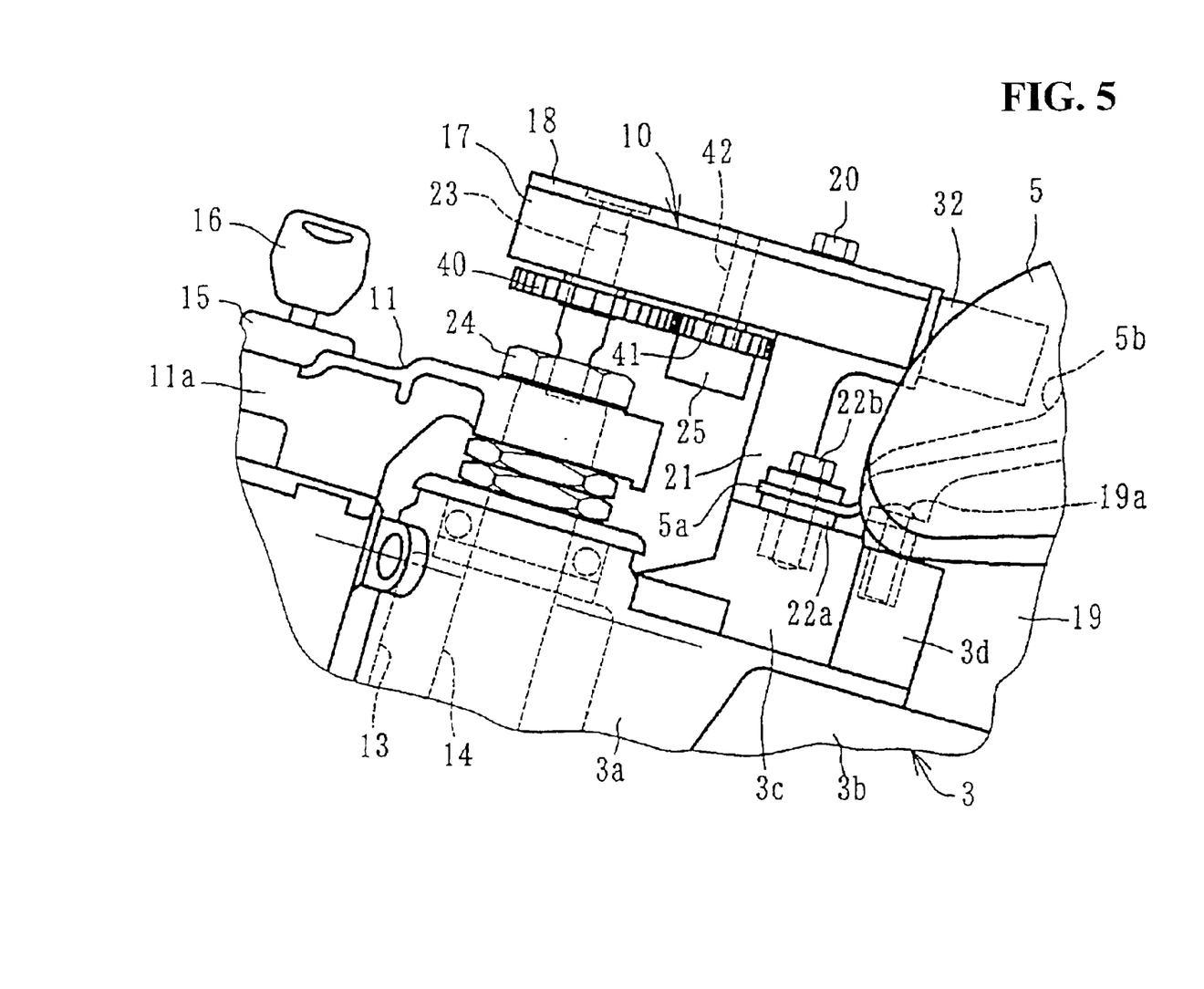
FIG. 5 is a side view of a portion around the steering damper according to another aspect of the present invention.

FIG. 5 shows the steering damper in another embodiment of the present invention regarding the arrangement of the turning angle speed sensor, which is an expanded view of the corresponding part in FIG. 2. In the following description, corresponding elements have the same reference numerals. In this figure, the turning angle speed sensor 25 is provided in a position in the rear of the steering shaft 14 and below a bottom of the main body 17. A coaxial gear 40 is engaged with a gear 41 coaxial with the steering shaft 14. It should be noted that a rotation shaft 42 of the turning angle speed sensor 25 is not coaxial with the shaft 23 and the steering shaft 14. The shaft 23 is engaged with the steering shaft 14 as in the case of the previous working example.

In this arrangement, the turning angle speed sensor 25 is provided between the top bridge 11 and the main body 17 of the steering damper 10. The rotation shaft 42 of the turning angle speed sensor 25 and the steering shaft 14 are separately provided as a two axial structure. Since both of the shafts are coupled by gears 40 and 41, the turning angle speed sensor 25 can measure an arbitrarily amplified turning angle by setup of gear ratio. Furthermore, an engagement portion between the gears 40 and 41 and the like are covered by the main body 17. Accordingly, there is no fear of entrance of foreign material in such portion, and the outer appearance is improved. It should be noted that the steering shaft 14 and the shaft 23 may be interlocked with each other by other members than the gears, e.g. a link mechanism.

It should be noted that the present invention is not limited to the above-described embodiment, but various modifications and applications can be made within the same principle of the invention. For example, the coupling between the shaft 23 and the steering shaft 14 may be made by other proper methods such as bolt fixing than engagement. Furthermore, the shaft 23 is not necessarily provided coaxially with the steering shaft 14.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A steering damper apparatus in a saddle-ride vehicle, comprising:

a steering damper, said steering damper including a hydraulic chamber filled with working liquid, said hydraulic chamber being formed in a casing, an inside of said hydraulic chamber being partitioned into two small hydraulic chambers by a rotatable partition wall provided in the hydraulic chamber, the small hydraulic chambers are in communication with each other via a liquid passage with a throttle, and a damping force is caused by relative rotation between said partition wall and said hydraulic chamber, wherein a rotation shaft of said partition wall is coupled to a steering shaft supported rotatably to a vehicle body front part, said casing is fixed to said vehicle body front part, and said liquid passage is provided on the vehicle body front part and located around the steering shaft.

2. The saddle-ride vehicle steering damper apparatus according to claim 1, wherein said partition wall includes said rotation shaft at a rotation radial direction inner end, and a rotation radial direction outer end rotates along an inner wall of said hydraulic chamber.

3. The saddle-ride vehicle steering damper apparatus according to claim 2, wherein a main switch is provided in a top bridge supported rotatably to said vehicle body front part via said steering shaft, and wherein the main switch and the rotation radial direction outer end of said partition wall are provided opposite to each other with said steering shaft therebetween.

4. The saddle-ride vehicle steering damper apparatus according to claim 2, wherein the throttle of said liquid passage and the rotation radial direction outer end of said partition wall are provided opposite to each other with said steering shaft therebetween.

5. The saddle-ride vehicle steering damper apparatus according to claim 2, wherein said throttle has a variable throttle mechanism, and wherein a control member of the variable throttle mechanism and said partition wall are provided opposite to each other with said steering shaft therebetween.

6. The saddle-ride vehicle steering damper apparatus according to claim 1, wherein said casing is provided above said steering shaft and a turning angle sensor is provided above said casing, and wherein a rotation shaft of the turning angle sensor is coupled to the rotation shaft of said partition wall.

7. A steering damper apparatus for a vehicle, comprising:
a steering damper, said steering damper including a hydraulic chamber filled with working liquid, said hydraulic chamber being formed in a casing, an inside of said hydraulic chamber being partitioned into two small hydraulic chambers by a rotatable partition wall provided in the hydraulic chamber, the small hydraulic chambers are in communication with each other via a liquid passage with a throttle, and a damping force is caused by relative rotation between said partition wall and said hydraulic chamber,
wherein a rotation shaft of said partition wall is mountable to a steering shaft supported rotatably to a vehicle body front part, said casing is mountable to the vehicle body front part, and said liquid passage is provided on the vehicle body front part and located around the steering shaft.

8. The steering damper apparatus according to claim 7, wherein said partition wall includes said rotation shaft at a rotation radial direction inner end, and a rotation radial direction outer end rotates along an inner wall of said hydraulic chamber.

9. The steering damper apparatus according to claim 8, wherein a main switch is provided in a top bridge supportable rotatably to the vehicle body front part via the steering shaft, and wherein the main switch and the rotation radial direction outer end of said partition wall are provided opposite to each other with the steering shaft therebetween.

10. The steering damper apparatus according to claim 8, wherein the throttle of said liquid passage and the rotation radial direction outer end of said partition wall are provided opposite to each other with the steering shaft therebetween.

11. The steering damper apparatus according to claim 8, wherein said throttle has a variable throttle mechanism, and wherein a control member of the variable throttle mechanism and said partition wall are mountable opposite to each other with the steering shaft therebetween.

12. The steering damper apparatus according to claim 7, wherein said casing is mountable above the steering shaft and a turning angle sensor is provided above said casing, and wherein a rotation shaft of the turning angle sensor is coupled to the rotation shaft of said partition wall.

13. A vehicle, comprising:
a vehicle body frame;
a steering shaft rotatably mounted to a front part of said vehicle body frame;
a steering damper, said steering damper including:
a hydraulic chamber filled with working liquid, said hydraulic chamber being formed in a casing; and
a rotatable partition wall provided in said hydraulic chamber, an inside of said hydraulic chamber being partitioned into two small hydraulic chambers by said rotatable partition wall, the small hydraulic chambers being in communication with each other via a liquid passage with a throttle, and a damping force is caused by relative rotation between said partition wall and said hydraulic chamber,
wherein a rotation shaft of said partition wall is coupled to said steering shaft supported rotatably to said vehicle body front part, said casing is fixed to said vehicle body front part, and said liquid passage is provided on the vehicle body front part and located around the steering shaft.

14. The vehicle according to claim 13, wherein said partition wall includes said rotation shaft at a rotation radial direction inner end, and a rotation radial direction outer end rotates along an inner wall of said hydraulic chamber.

15. The vehicle according to claim 14, wherein a main switch is provided in a top bridge supported rotatably to said vehicle body front part via said steering shaft, and wherein the main switch and the rotation radial direction outer end of said partition wall are provided opposite to each other with said steering shaft therebetween.

16. The vehicle according to claim 14, wherein the throttle of said liquid passage and the rotation radial direction outer end of said partition wall are provided opposite to each other with said steering shaft therebetween.

17. The vehicle according to claim 14, wherein said throttle has a variable throttle mechanism, and wherein a control member of the variable throttle mechanism and said partition wall are provided opposite to each other with said steering shaft therebetween.

18. The vehicle according to claim 13, wherein said casing is provided above said steering shaft and a turning angle sensor is provided above said casing, and wherein a rotation shaft of the turning angle sensor is coupled to the rotation shaft of said partition wall.

19. A steering damper apparatus for a vehicle, comprising:
a steering damper, said steering damper including a hydraulic chamber filled with working liquid, said hydraulic chamber being formed in a casing, an inside of said hydraulic chamber being partitioned into two small hydraulic chambers by a rotatable partition wall provided in the hydraulic chamber, the small hydraulic chambers are in communication with each other via a liquid passage with a throttle, and a damping force is caused by relative rotation between said partition wall and said hydraulic chamber,
wherein a rotation shaft of said partition wall is mountable to a steering shaft supported rotatably to a vehicle body front part, said casing is mountable to the vehicle body front part, and said casing is mountable above the steering shaft and a turning angle sensor is provided above said casing, and wherein a rotation shaft of the turning angle sensor is coupled to the rotation shaft of said partition wall.

20. The steering damper apparatus according to claim 19, wherein said partition wall includes said rotation shaft at a rotation radial direction inner end, and a rotation radial direction outer end rotates along an inner wall of said hydraulic chamber.

21. The steering damper apparatus according to claim 20, wherein a main switch is provided in a top bridge supportable rotatably to the vehicle body front part via the steering shaft, and wherein the main switch and the rotation radial direction outer end of said partition wall are provided opposite to each other with the steering shaft therebetween.

22. The steering damper apparatus according to claim 20, wherein the throttle of said liquid passage and the rotation radial direction outer end of said partition wall are provided opposite to each other with the steering shaft therebetween.

23. The steering damper apparatus according to claim 20, wherein said throttle has a variable throttle mechanism, and wherein a control member of the variable throttle mechanism and said partition wall are mountable opposite to each other with the steering shaft therebetween.

* * * * *